(12) United States Patent
Bland et al.

(10) Patent No.: US 12,434,835 B1
(45) Date of Patent: Oct. 7, 2025

(54) LINE CLIMBER FOR KITE-BASED ATMOSPHERIC PROFILING AND REMOTE SENSING

(71) Applicant: United States of America as represented by the Administrator of NASA, Washington, DC (US)

(72) Inventors: Geoffrey L. Bland, Parksley, VA (US); Joseph Bretthauer, Silver Spring, MD (US); Richard Craincross, Philadelphia, PA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 18/383,192

(22) Filed: Oct. 24, 2023

(51) Int. Cl.
  *B64C 31/06* (2020.01)
(52) U.S. Cl.
  CPC .................................. *B64C 31/06* (2013.01)
(58) Field of Classification Search
  CPC ...... B64C 31/06; A63H 27/002; A63H 27/08; B64U 10/50; B64U 10/60
  See application file for complete search history.

(56) References Cited

U.S. PATENT DOCUMENTS

| | | | | |
|---|---|---|---|---|
| 8,894,001 B2* | 11/2014 | Calverley | ................ | F03D 9/25 244/17.23 |
| 9,178,241 B2* | 11/2015 | Davidson | .......... | H01M 8/04201 |
| 9,643,721 B2* | 5/2017 | Schaefer | ................... | F03D 5/00 |
| 2007/0176432 A1* | 8/2007 | Rolt | ....................... | F03D 9/255 290/55 |
| 2011/0089287 A1* | 4/2011 | Deale | ..................... | A63H 30/04 244/12.4 |
| 2011/0174932 A1* | 7/2011 | Tellem | ................... | B64C 31/06 244/155 R |
| 2015/0275861 A1* | 10/2015 | Goldstein | ................ | F03D 9/25 290/55 |
| 2018/0094619 A1* | 4/2018 | Sellers | ...................... | F03D 9/34 |

* cited by examiner

*Primary Examiner* — Joshua D Huson
*Assistant Examiner* — Vicente Rodriguez
(74) *Attorney, Agent, or Firm* — Derek J. Langdon; Matthew F. Johnston; Trenton J. Roche

(57) ABSTRACT

A kite-based line climber apparatus includes a fuselage; a wing assembly connected to the fuselage; an elevator assembly connected to the fuselage; and a line attachment assembly. The line attachment assembly has a pylon extending through and connected to the wing assembly and one or more coupling members disposed on the mast member. A kite line of the kite is configured to be coupled to or run along the coupling member(s). The apparatus provides a light weight aerodynamically efficient design for a line climber that enables a high level of altitude control as well as climb/decent speed.

16 Claims, 11 Drawing Sheets

US 12,434,835 B1

LINE CLIMBER FOR KITE-BASED ATMOSPHERIC PROFILING AND REMOTE SENSING

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefore.

FIELD

The aspects of the disclosed embodiments relate generally to kite based line climbers. In particular, the aspects of the disclosed embodiments are directed to a high performance line climber for kite-based atmospheric profiling and remote sensing.

BACKGROUND

"Line Climbers" have been used to carry instrumentation up and down kite tether lines for several decades. Current line climber devices tend to be heavier and more difficult to control when needed to carry instrumentation packages.

Typical kite based line climbers must operate in changing wind conditions. Different wind speeds can make it difficult to control the rate of ascent and descent in a uniform manner. It can also be challenging to control an altitude of a line climber or stop a line climber with precision under changing wind speeds and conditions.

Accordingly, it would be desirable to provide an apparatus that addresses at least some of the problems described above.

SUMMARY

The aspects of the disclosed embodiments are directed to a high performance line climber for kite-based atmospheric profiling and remote sensing. This and other advantages of the disclosed embodiments are provided substantially as shown in, and/or described in connection with, at least one of the figures, as set forth in the independent claims. Further advantageous modifications can be found in the dependent claims.

According to a first aspect the disclosed embodiments are directed to a kite-based line climber apparatus. In one embodiment, the apparatus includes a fuselage; a rigid wing assembly connected to the fuselage; an elevator assembly connected to the fuselage; and a line attachment assembly. The line attachment assembly includes a pylon extending through and connected to the rigid wing assembly and one or more coupling members disposed on the pylon. A kite line of a kite is configured to be disposed in connection with the one or more coupling members in a manner that allows the apparatus to traverse the kite line.

In a possible implementation form a side member of the fuselage is removable to enable the kite line to be coupled to the one or more coupling members. This enables the kite line to be connected to the fuselage without having to remove the instrumentation pod as in prior constructions.

In a possible implementation form, the apparatus further includes an elevator assembly connected to the fuselage.

In a possible implementation form, the elevator assembly is a radio-controlled elevator assembly.

In a possible implementation form, the fuselage is removably connected to the wing assembly.

In a possible implementation form, the wing is a rigid wing.

In a possible implementation form, the wing is a flexible wing.

In a possible implementation form, the wing is flat.

In a possible implementation form, the wing is curved.

In a possible implementation form, the wing includes a downward facing wing tip at each end.

In a possible implementation form, a vertical tail member is connected to the fuselage.

In a possible implementation form, the vertical tail member is removably connected to the fuselage.

In a possible implementation form, a payload pod is connected to the fuselage.

In a possible implementation form, the one or more coupling members comprise pulleys. The kite line is configured to be coupled to the pulley(s) in a manner that enables the kite line climber apparatus to traverse the kit line in two directions.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the aspects of the disclosed embodiments will be described in more detail with reference to the example embodiments shown in the drawings, in which.

DETAILED DESCRIPTION

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
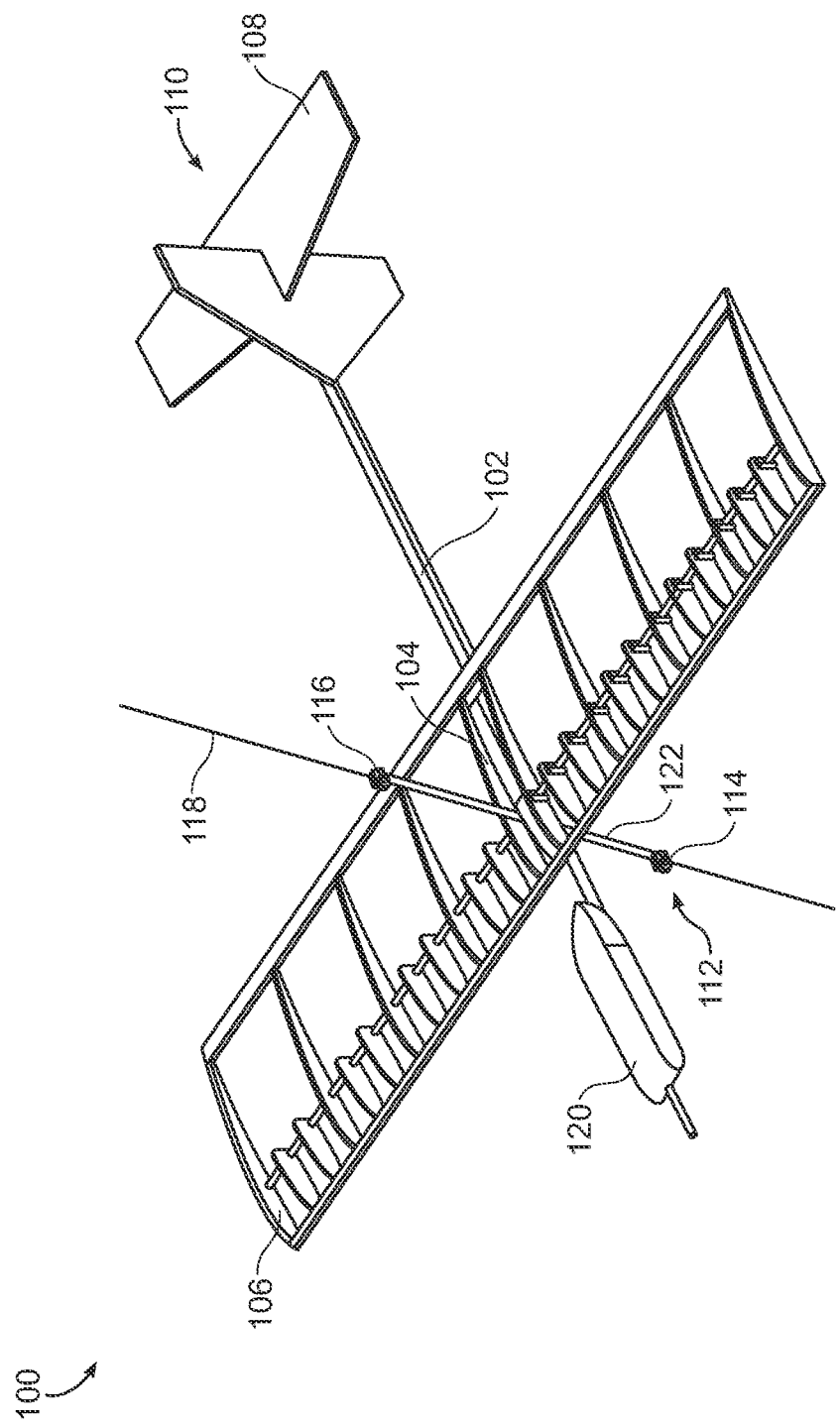
FIG. 1 is top down perspective illustration of an exemplary apparatus incorporating aspects of the disclosed embodiments.

FIG. 1 is a schematic block diagram of an exemplary apparatus 100 incorporating aspects of the disclosed embodiments. The aspects of the disclosed embodiments are generally directed to a high performance line climber apparatus 100 for kite-based atmospheric profiling and remote sensing. The apparatus 100 is generally a rigid-wing system intended to carry a payload pod 120 with a sensor or instrument package up and down a kite line 10 using the lift generated from apparent wind. While a rigid-wing system is generally referred to herein, the aspects of the disclosed embodiments are not so limited. In alternate embodiment, any suitable wing system can be implemented, such as for example, a flexible wing or sail.

Unlike a typical flexible sail-like structure, the apparatus 100 is generally configured to maintain its geometry throughout the flight regime, with the exception of moveable control surface(s), such as for example elevator 108, which can be used to modify the angle-of-attack and increase or decrease the aerodynamic lift of the apparatus 100. The apparatus 100 of the disclosed embodiments has lighter wing loading and a higher lift airfoil to enable flight in lighter wind conditions. The apparatus 100 is also configured to provide the ability to stop with precision along the kite line 118, also referred to as a tether herein, in varying wind conditions.

As shown in FIG. 1, the apparatus 100 includes a fuselage 102. The fuselage 102 generally comprises a lightweight, but rigid and sturdy material. Example include, but are not limited to, balsa wood, carbon fiber and composites. The aspects of the disclosed embodiments are not intended to be limited by the particular type of material for the fuselage.

In one embodiment, the fuselage 102 is removable, or can be detached from one or more parts of the assembly shown, for easier transport of the apparatus 100. As will be described further below, in one embodiment, one side 104 of the fuselage 102 is removable so that the payload pod 120 does not need to be removed for connecting the apparatus 100 to the kite string or line 10.

Connected to the fuselage 102 is a wing assembly 106. In one embodiment, the wing assembly 106 is a rigid wing using an airfoil optimized for low Reynolds Numbers. As shown in the example of FIG. 1, the wind assembly 106 is a flat wing assembly, meaning that the wings do not tip up and there is no dihedral angle. The structural approach of the apparatus 100 is tailored for minimum weight under expected flight loads.

As shown in FIG. 1, a tail assembly or canard assembly 110 with an elevator-based control system 108 is also connected to the fuselage 102. The tail assembly 110 is generally configured as a vertical tail assembly and is removable for transport of the apparatus 100.

The elevator 108, also referred to as an elevator based control system, forms part of the tail assembly 110 or is otherwise connected to the fuselage 102 for pitch control, as is generally understood. Any suitable mechanism or system can be used to control movement of the elevator. In one embodiment, the elevator 108 is a radio-controlled elevator, as is further described herein.

Figure 6:
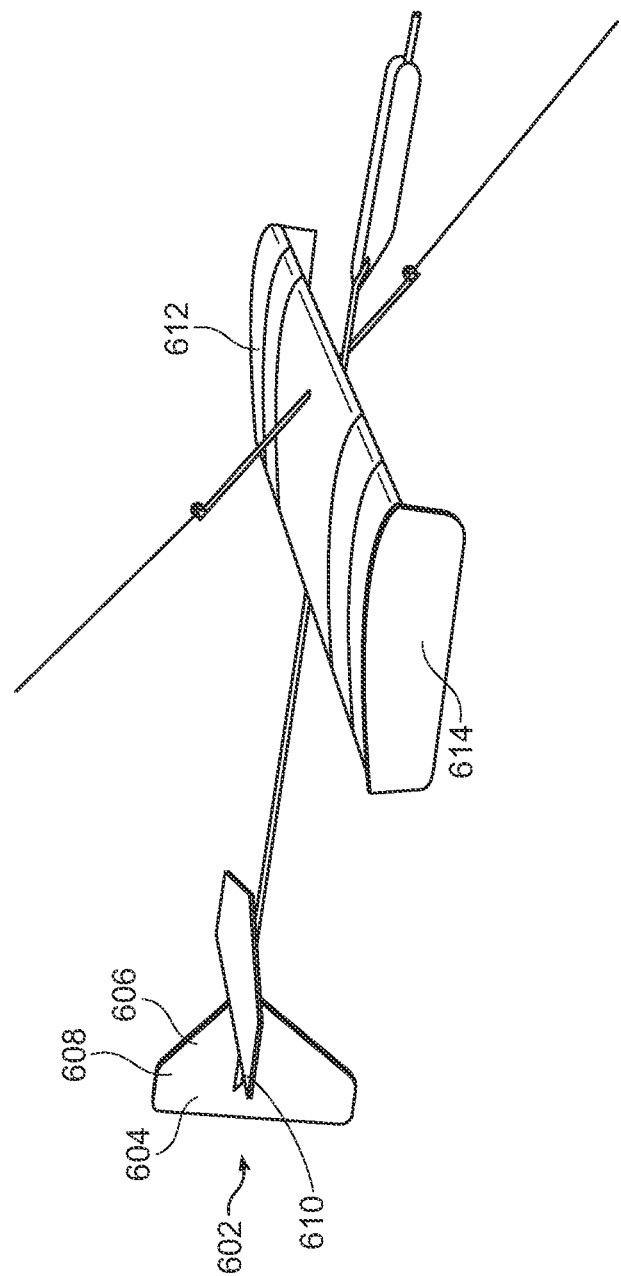
FIG. 6 is a side perspective view of an exemplary apparatus incorporating aspects of the disclosed embodiments.

Referring to FIG. 6, in one embodiment, the tail assembly 110 can include a rudder assembly 602. In this example, the rudder assembly 602 can include a rudder member 604, a fin member 606 and a hinge line or assembly 608. A control horn or mechanism 610 is used to control the left and right movement of the rudder 604 for yaw control.

Figure 2:
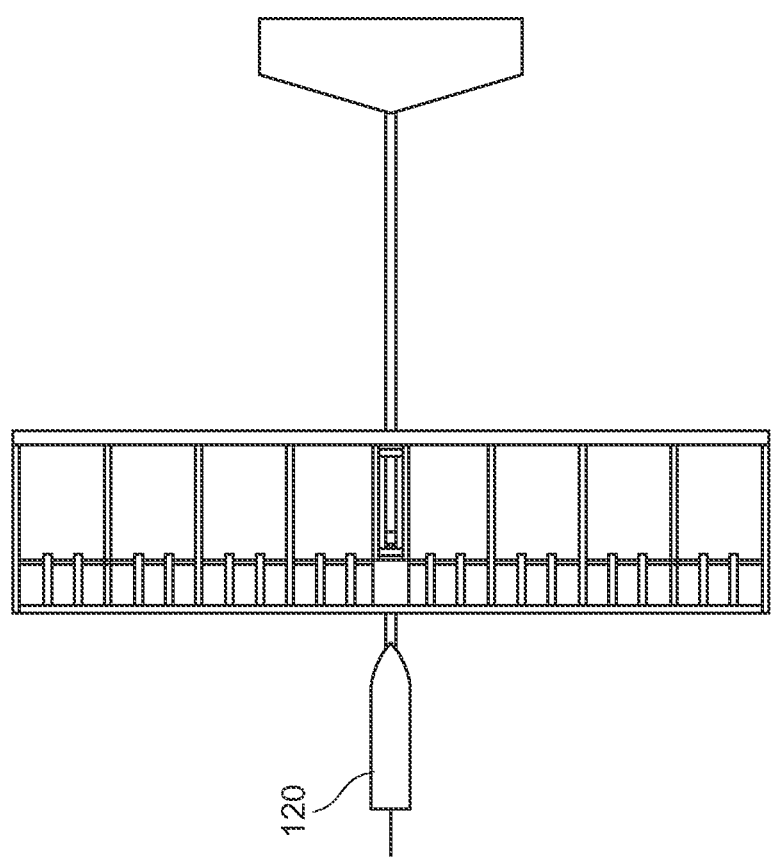
FIG. 2 is top plan view of an exemplary apparatus incorporating aspects of the disclosed embodiments.
Figure 3:
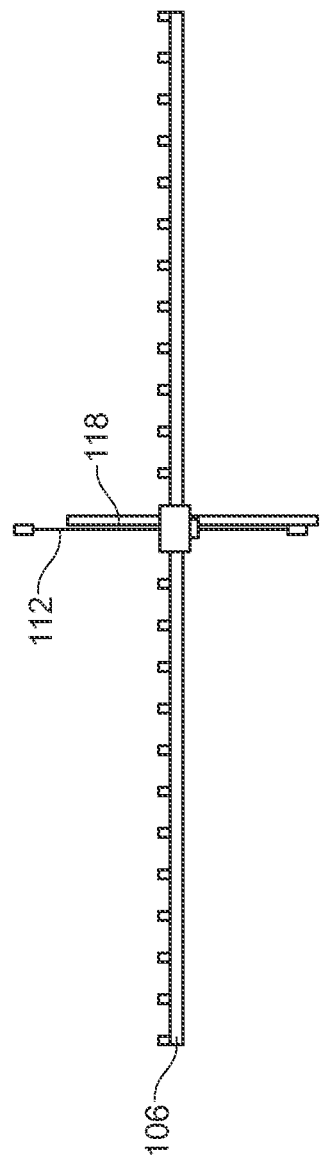
FIG. 3 is an end view of an exemplary apparatus incorporating aspects of the disclosed embodiments.

As illustrated in FIGS. 1 and 2, a forward end of the apparatus 100 includes a payload pod 120. The payload pod 120 is generally configured to carry instrumentation, such as a modular instrumentation package. The instrumentation, not shown in the Figures, which might be disposed in the payload pod 120 can include, but is not limited to, devices and sensors such as cameras, atmospheric sensors, or other sensing or measurement devices. The aspects of the disclosed embodiments are not intended to be limited by the specific types of instrumentation.

Figure 5:
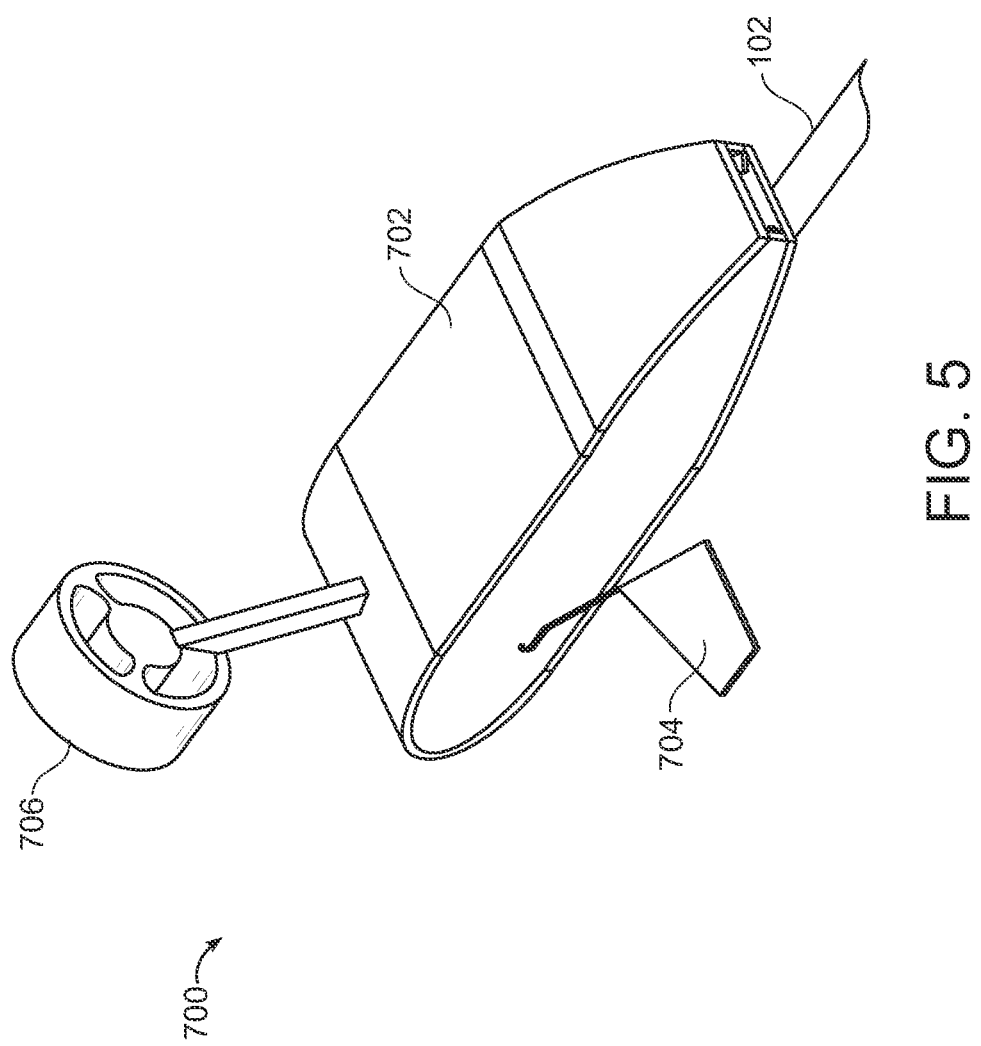
FIG. 5 illustrates a perspective view of exemplary payload or instrumentation pod for a line climber apparatus incorporating aspects of the disclosed embodiments.

FIG. 5 provides a more detailed view of an exemplary payload pod 500 incorporating aspects of the disclosed embodiments. In this example, the payload pod 500 includes a closed instrumentation bay or compartment 502. Also shown or various sensors or antennas 504, 506, generally configured to sense and receive signals, such as wind speed and atmospheric conditions, for example.

In one embodiment the instrumentation is integrated within the payload pod 120 such that the center-of-gravity of the apparatus 100 is within a prescribed location envelope. The apparatus 100 provides a stable platform for a variety of instruments (including cameras) with a reasonably compact size, light weight, and high performance across a wide range of wind conditions.

Referring again to FIG. 1, the apparatus 100 also includes a kite line attachment assembly 112. The kite line attachment assembly 112 is configured to attach or couple to the kite line 118 in a manner that allows the line climber apparatus 100 to traverse the kite line in an up and down manner. In one embodiment, the kite line attachment assembly 112 is a pulley mechanism, and the kite line 118 is retained with respect to the pulley.

As shown in FIG. 1, the kite line attachment assembly 112 includes a first coupling member 114 and a second coupling member 116. The first coupling member 114 and the second coupling member 116 are attached or otherwise secured to a shaft or rod 122, also referred to as a pylon or mast. In one embodiment the pylon 122 comprises a wood, carbon fiber or composite material that is sturdy and lightweight.

The first coupling member 114 and the second coupling member 116 are spaced apart from one another along the pylon 122, with one coupling member 114 being disposed below a surface of the wing 106 and the other coupling member 116 being disposed above a surface of the wing 106.

Although the example of FIG. 1 shows two coupling members 114, 116, the aspects of the disclosed embodiments are not so limited. In alternate embodiments, the kite line attachment assembly 112 comprises a single coupling device. In one embodiment, the kit line attachment assembly 112 can also include a brake (not shown) that is configured to secure the apparatus 100 to the kite line 118 in a stationary manner.

Figure 8:
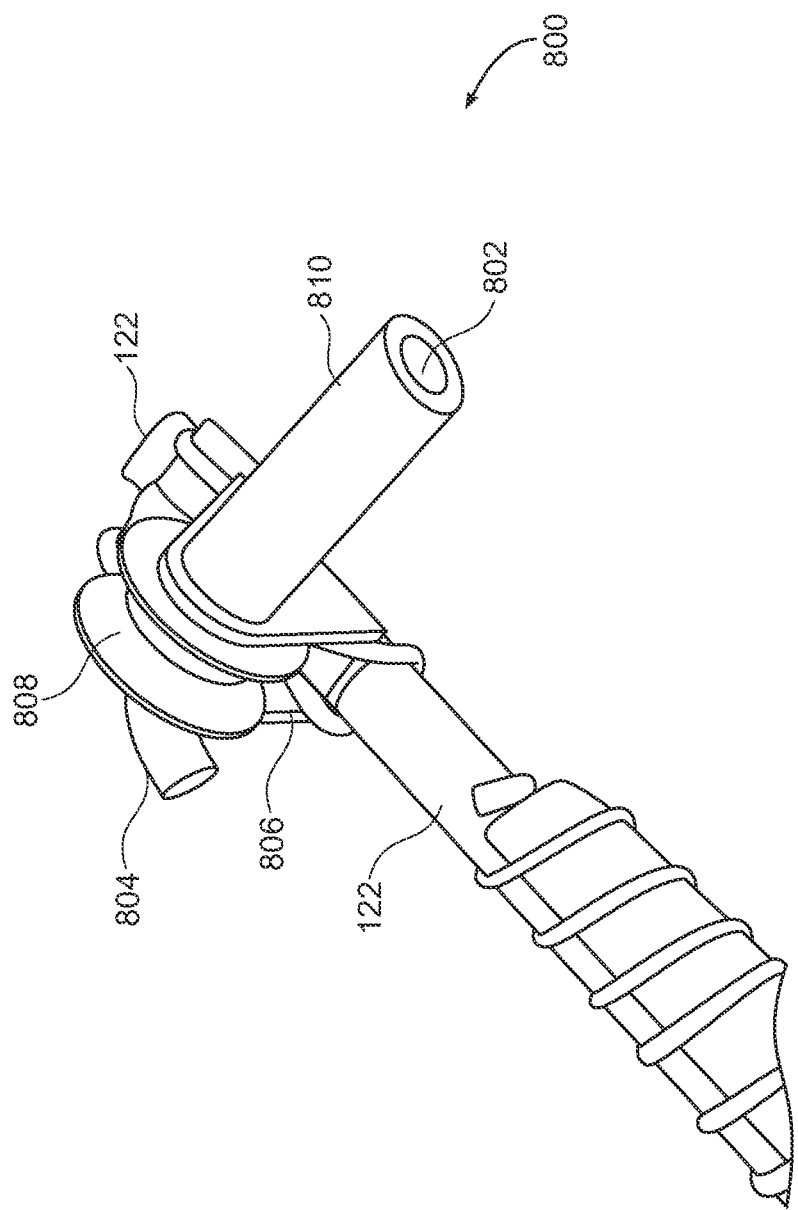
FIG. 8 illustrates a kite line attachment assembly for a kite line climber apparatus incorporating aspects of the disclosed embodiments.
Figure 9:
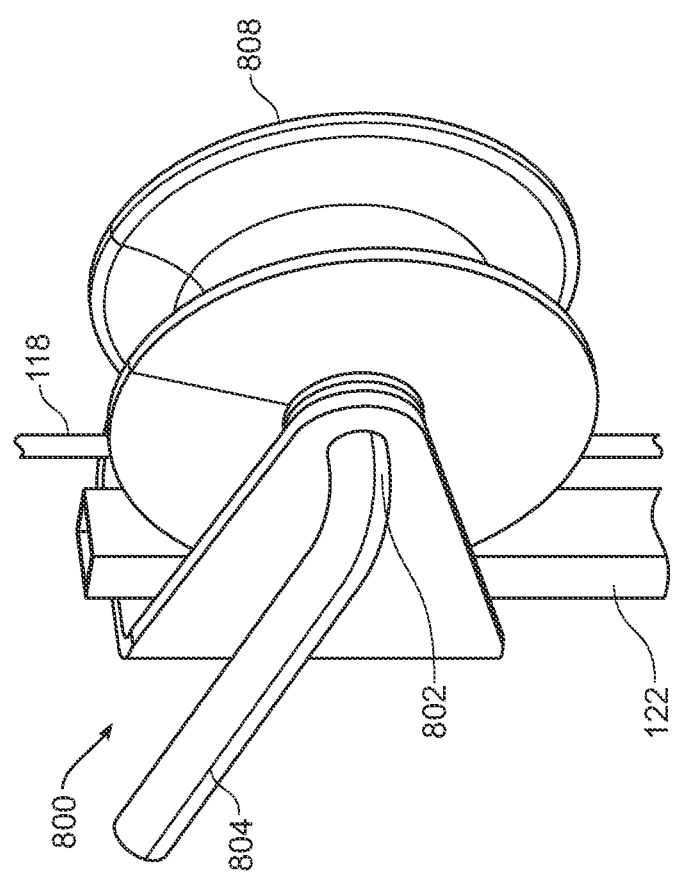
FIG. 9 is a detail view of a kite line attachment assembly for a kite line climber apparatus incorporating aspects of the disclosed embodiments

FIGS. 8 and 9 illustrate one example of a coupling device 800 for an exemplary kite line attachment assembly 112. In this example, a single coupling device 800 is illustrated and comprises a pin and stopper type device or assembly. As shown in FIG. 8, the exemplary coupling device 800 includes a pin 802 that has a hooked end 804. The shaft of the pin 802 extends through corresponding openings in a bracket member 806. A pulley 808 is disposed within the bracket member 806, and the shaft of the pin 802 extends through a corresponding opening in the pulley 808. The pulley 808 is configured to rotate about the shaft of the pin 802 within the bracket member 806. In this example, the bracket 806 is attached or secured to the pylon 122 in a suitable manner.

The pin 802 is configured to be inserted into an opening on one side of the bracket 806, through the opening in the pully 808, and out through another opening on the other side of the bracket 806. The hooked end 804 of the pin 802 is configured to retain that end of the pin 802 against or near the side and corresponding opening of the bracket 806.

In one embodiment, a sleeve member 810 can be disposed over shaft portion of the pin 802 that extends from the bracket 806, on the end of the pin 802 opposite the hooked end 804. The sleeve member 810 can comprise a piece of tubing that can be taken on and off the pin 802, but remains in place until removed. The sleeve member 810 is used to retain the pin 802 in place in a manner that allows that allows the pulley 808 to rotate about the pin 802.

While a pin and stopper device is shown in the examples of FIGS. 8 and 9, the aspects of the disclosed embodiments are not so limited. In alternate embodiments, an suitable arrangement can be used to retain the pulley 808 within the bracket 806. For example, a screw and bolt arrangement can be used. The configuration should allow the pulley 808 to be removed and allow the kite line 118 to be secured therein so that the line climber apparatus 100 can traverse the kite line 118 in an up and down manner.

Figure 10:
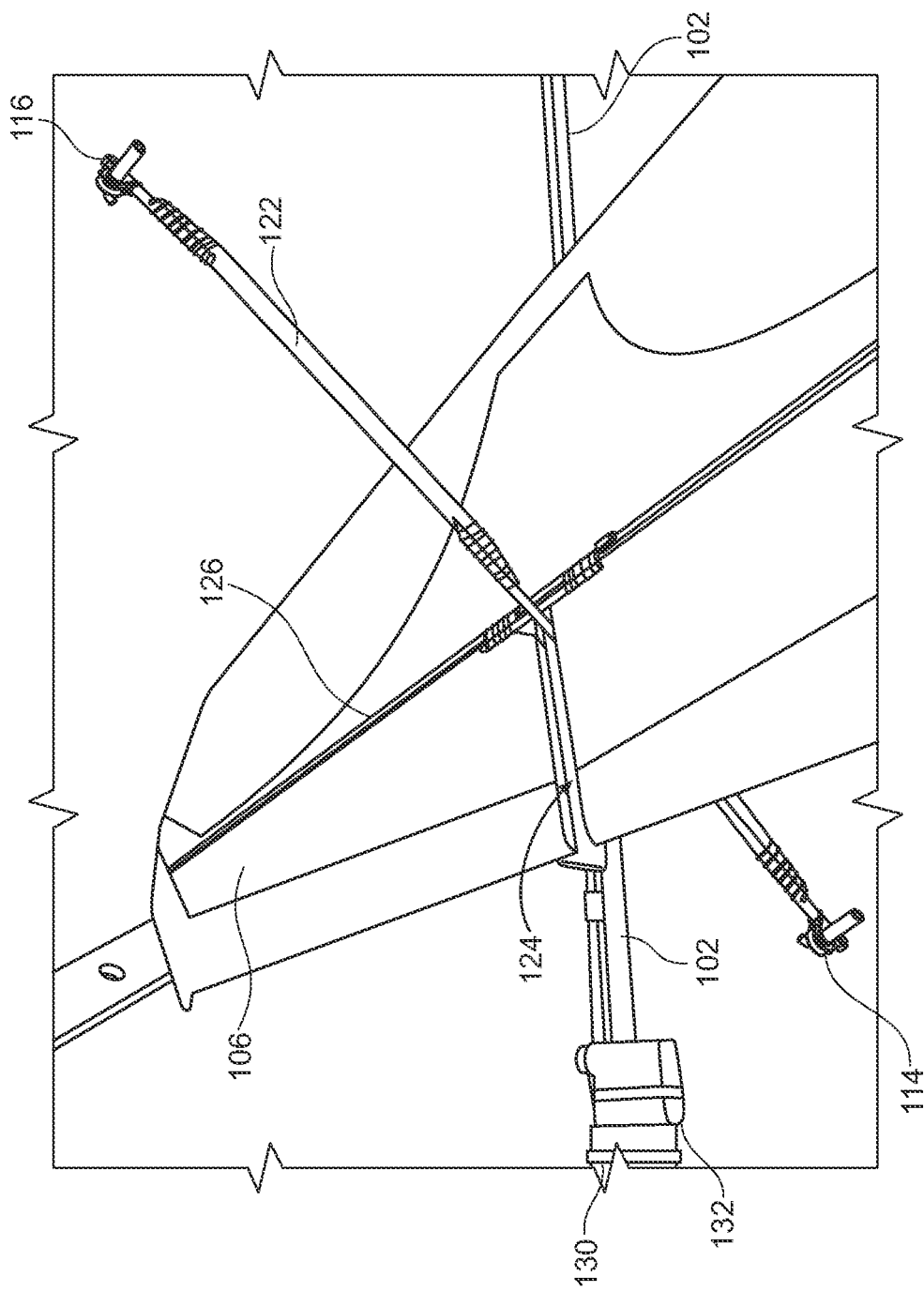
FIG. 10 illustrates a portion of an exemplary wing assembly for a kite line climber apparatus incorporating aspects of the disclosed embodiments
Figure 11:
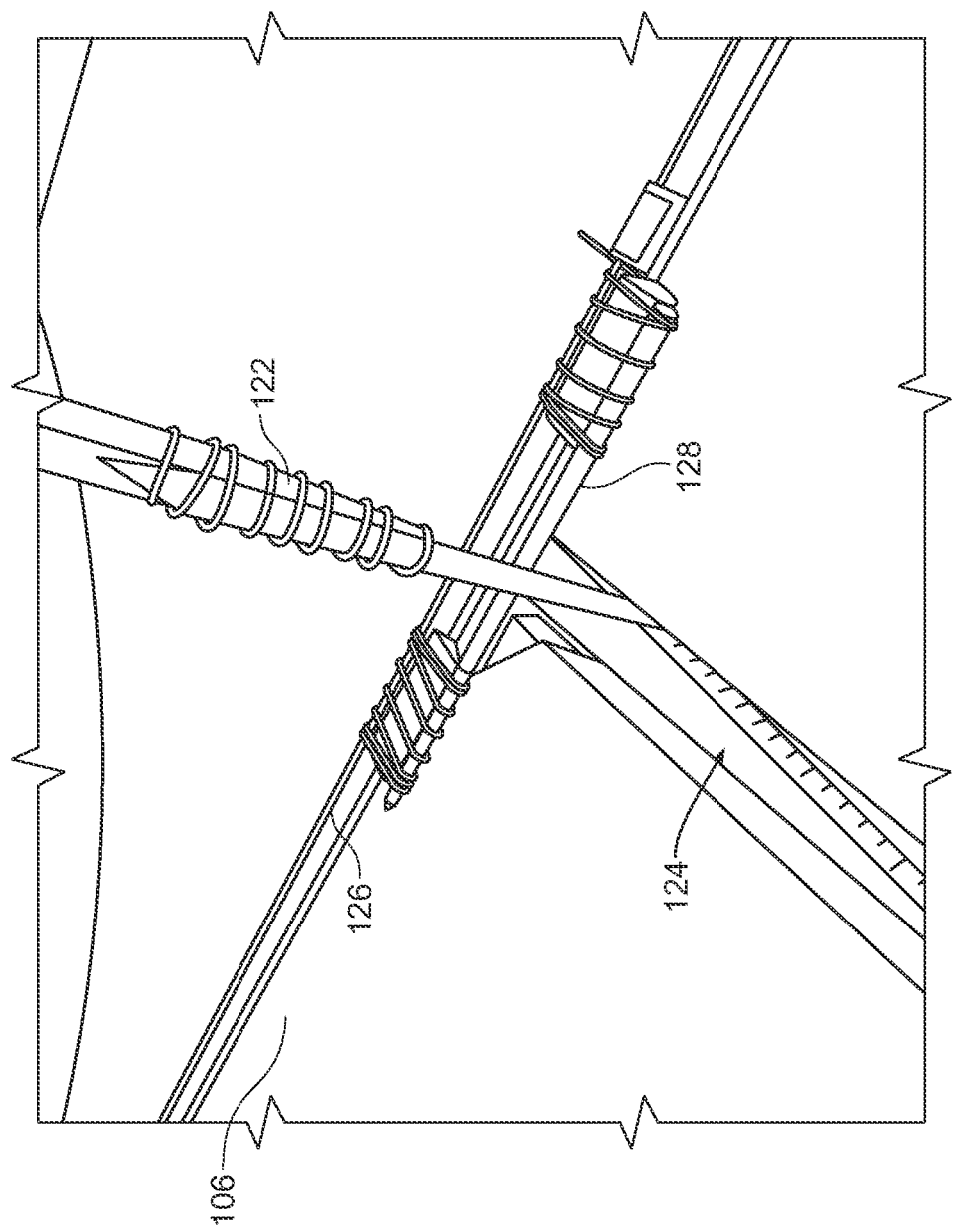
FIG. 11 illustrates a detail of the exemplary wing assembly shown in FIG. 10.

Referring again to FIG. 1, in one embodiment, the pylon 122 is configured to coupled or connected to the fuselage 102. As shown in FIG. 1, the pylon 122 extends through the fuselage 102. Referring to FIGS. 10 and 11, in one embodiment, the wing 106 can include an elongated opening or slot 124 that is configured to receive the pylon 122 and allow the pylon to move forward and aft within the opening 124 as the position of the kite line 118 varies. In this example, the wing 106 is a foam member as a tailored airfoil.

In one embodiment, a pin member 128 is disposed against a supporting member 126 of the wing 106. The supporting member 126 can comprise a carbon fiber material. This allows the pylon 122 to pivot about the support member 126 as the pylon 122 move or rotates forward and aft within the opening 124. In alternate embodiments, any suitable arrangement can be used to allow the pylon 112 to move or rotate.

FIG. 10 also illustrates a control system 130 for the apparatus 100. The control system 130 either remotely commanded or pre-programmed, is generally configured to enable the ascent and descent of the apparatus 100 to be modified during flight. The control system 130 can be modeled after typical aircraft design, utilizing a moveable surface, such as elevator 108, for controlling the pitch attitude and thereby modifying the lift to climb or descend. The control system 130 is configured to be manipulated via radio control link or preprogrammed flight computer.

In one embodiment, the control system 130 includes a radio controlled receiver 132 and a servo motor 134. The receiver 132 and servo motor 134 are generally connected to the fuselage 102. The receiver 132 is typically battery powered and configured to receive commands from a ground control.

The receiver 132 can be used to control the servo motor 134, for example, which is also secured to the fuselage 102. In one embodiment, the servo motor 134 is used to control the elevator 108. In this example, there are wires or strings connected between the servo motor 134 and the elevator 108 that enable the control of the pitch attitude, as will be generally understood.

Figure 4:
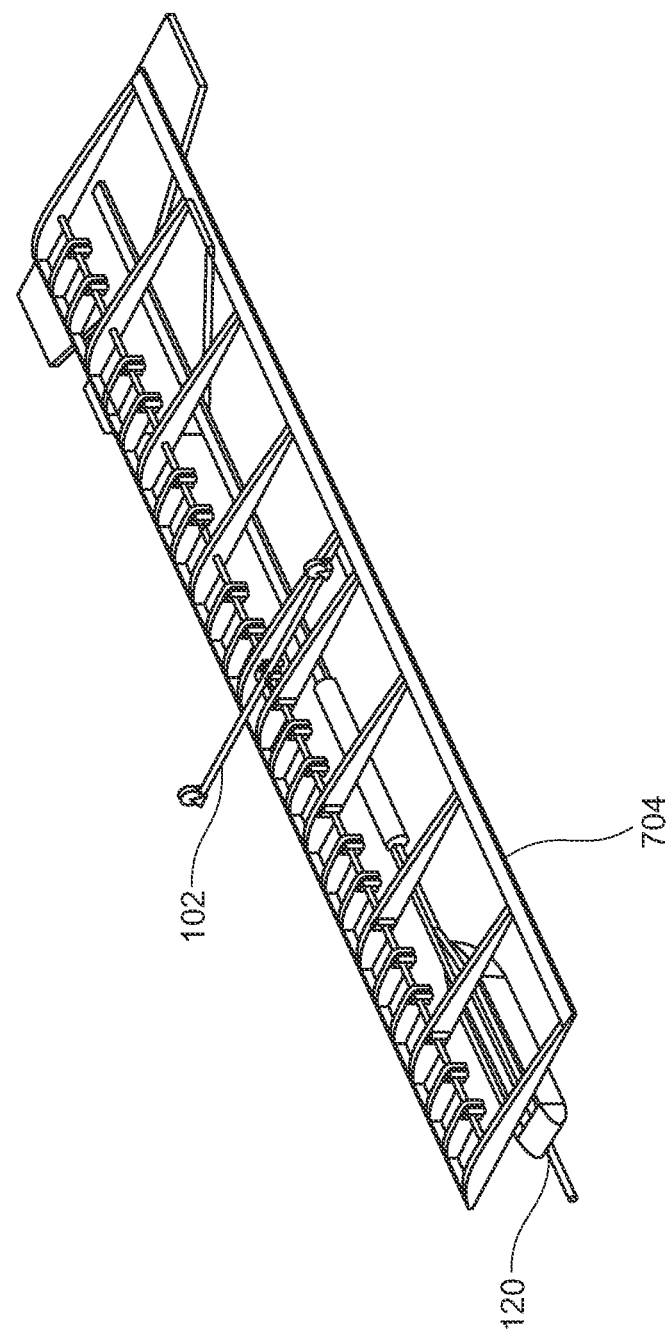
FIG. 4 is a top perspective view of a wing assembly for an exemplary apparatus incorporating aspects of the disclosed embodiments.

FIG. 4 illustrates one example of a wing assembly 106 incorporating aspects of the disclosed embodiments. In this example, the payload pod 120 is disposed under a surface of the wing assembly, near an end of the wing. In alternate embodiments, the payload pod 120 can be disposed at any suitable location of the apparatus 100.

Referring to FIG. 6, in one embodiment, the wing assembly 612 includes a tip 614 at or along the end of the wing 612. In the example of FIG. 6, the tip 614 is a panel that hangs down from a surface of the wing. The tip 614 can also be referred to as a drooped wing tip or end plate. In the example of FIG. 6, the tip 614 is generally disposed below a surface of the wing 612. However, the tip 614 can also be disposed at least partially above the surface of the wing 612. The tip(s) 614 are generally configured to reduce rolling of the apparatus 100.

Figure 7:
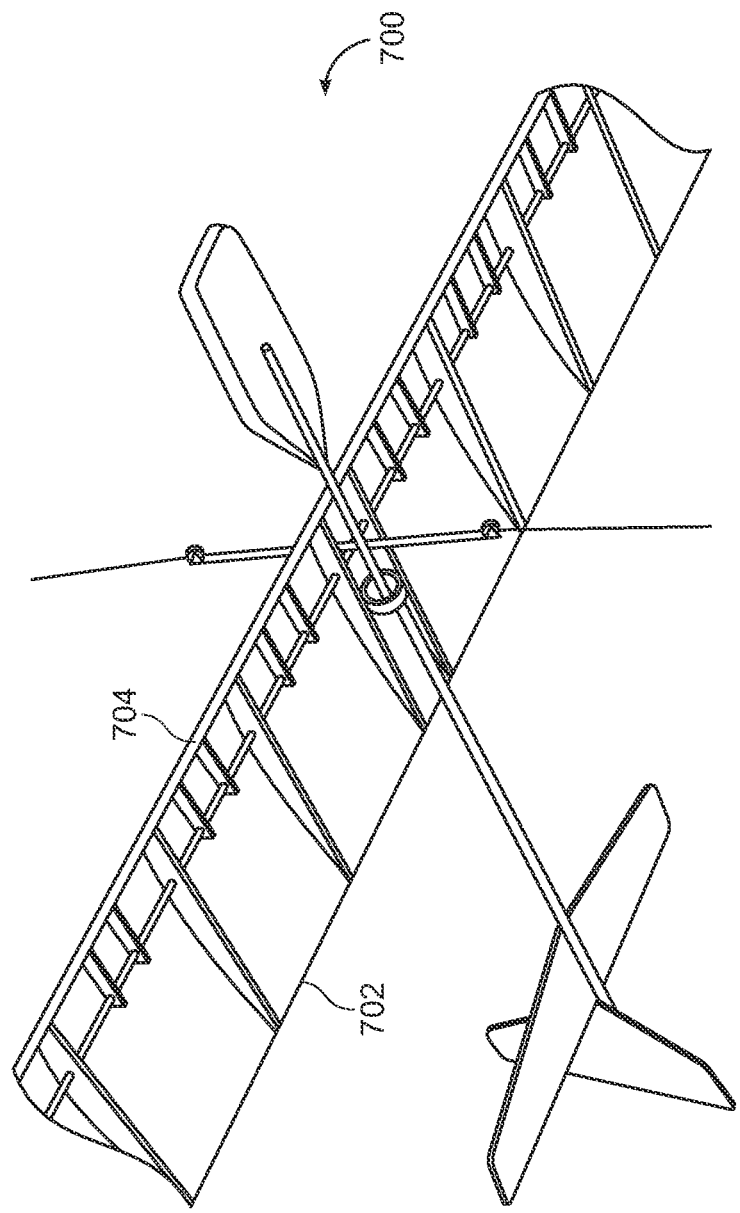
FIG. 7 is a bottom perspective view of an exemplary apparatus incorporating aspects of the disclosed embodiments.

FIG. 7 illustrates the use of aileron(s) 702 as part of the wing assembly 704 of an exemplary line climber apparatus 700. The aileron(s) 702 can be used to control roll and stability of the wing assembly 704.

The apparatus 100 is based on techniques typically associated with aircraft wing design. These include a structural spar or wing 106 with sufficient thickness to carry lift induced bending and drag loads, a leading edge with a tailored aerodynamic shape, and an appropriately thin trailing edge to generate lift coefficients in excess of those typical of sail-based surfaces. The use of a wood structure with/plastic covering, molded foam with reinforcement (if needed), or other materials for the wing 106 is envisioned to be suitable for these aerodynamically and structurally tailored surfaces.

The apparatus 100 of the disclosed embodiments provides a light weight, aerodynamically efficient design, that enables a high level of control of altitude and climb/decent speed for miniature sensor systems. The apparatus 100 uses high performing aerodynamic approaches such as wing airfoil selection, tail arrangement for stability and control, methods for line attachment and sensor integration provisions. The sensor integration provisions enable a practical and commercially viable instrument platform.

Possible uses of the apparatus 100 include, but are not limited to, air-quality measurements, atmospheric boundary layer observations, distributed observations of local-scale weather related events, and remote sensing applications. For example, field-of-view and resolution of a fixed lens camera can be traded as desired.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A kite-based line climber apparatus for operating in changing wind conditions, where different windspeeds impact controlling a rate of ascent and descent, comprising:
   a kite;
   a fuselage;
   a wing assembly connected to the fuselage;
   an elevator assembly connected to the fuselage; and
   a line attachment assembly comprising:
   a pylon extending through and connected to the wing assembly;
   one or more coupling members disposed on the pylon; and
   wherein a kite line of the kite is configured to be coupled to the one or more coupling members to allow the line climber apparatus to traverse the kite line;
   wherein the one or more coupling members comprise pulleys,
   wherein the kite line is coupled to the pulleys and enable the line climber to traverse the kite line in two directions with the line attachment assembly with a first coupling member and a second coupling member, said first coupling member and said second coupling member operably connected to said pylon;
   with said first coupling member and said second coupling member spaced apart from one another along said pylon, with said first coupling member disposed below a surface of the wing assembly and said second coupling member disposed above a surface of the wing assembly;
   wherein each of said first and second coupling members each comprise a pin and stopper assembly with a hooked end and a shaft of the pin extends through corresponding openings in a bracket with a pulley disposed within the bracket, and the shaft of the pin extends through a corresponding opening in the pulley where the pulley is configured to rotate about the shaft of the pin within the bracket.

2. The apparatus of claim 1, further comprising a side member of the fuselage that is
   removable to enable the kite line to be coupled to the one or more coupling members.

3. The apparatus of claim 1, wherein the elevator assembly is a radio-controlled elevator assembly.

4. The apparatus of claim 1, wherein the fuselage is removably connected to the wing assembly.

5. The apparatus of claim 1, further comprising a vertical tail member connected to the fuselage.

6. The apparatus according to claim 5, wherein the vertical tail member is removably connected to the fuselage.

7. The apparatus according to claim 5, wherein the vertical tail member comprises a rudder assembly.

8. The apparatus according to claim 1, further comprising a payload pod connected to the fuselage.

9. The apparatus according to claim 1, wherein the wing assembly further comprises a drooped wing tip at an end of the wing assembly.

10. The apparatus according to claim 1, wherein the wing assembly further comprises an aileron disposed on a trailing edge of the wing assembly.

11. The apparatus according to claim 1, wherein the wing assembly comprises a rigid wing assembly.

12. The apparatus according to claim 1, wherein the wing assembly comprises a sail.

13. The apparatus according to claim 1, wherein the wing assembly comprises a flat wing.

14. The apparatus according to claim 1, wherein the wing assembly further comprises a slot that is configured to accommodate the pylon and allow the pylon and line attachment assembly to move within the slot.

15. The apparatus according to claim 1, further comprising a radio-controlled control system configured to receive commands to control an ascent and descent of the apparatus.

16. The apparatus according to claim 15, wherein the control system comprises a receiver and a servo motor, the servo motor be configured to control movement of the elevator assembly based on commands received from the receiver.

* * * * *